(12) United States Patent  
Miskin

(10) Patent No.: US 8,841,855 B2
(45) Date of Patent: Sep. 23, 2014

(54) LED CIRCUITS AND ASSEMBLIES

(75) Inventor: Michael Miskin, Sleepy Hollow, IL (US)

(73) Assignee: Lynk Labs, Inc., Elgin, IL (US)

(*) Notice: Subject to any disclaimer, the term of this patent is extended or adjusted under 35 U.S.C. 154(b) by 40 days.

(21) Appl. No.: 13/450,938

(22) Filed: Apr. 19, 2012

(65) Prior Publication Data

US 2012/0262085 A1 Oct. 18, 2012

Related U.S. Application Data

(62) Division of application No. 12/287,267, filed on Oct. 6, 2008, now Pat. No. 8,179,055.

(60) Provisional application No. 60/997,771, filed on Oct. 6, 2007.

(51) Int. Cl.
*H05B 41/16* (2006.01)
*H05B 41/24* (2006.01)

(52) U.S. Cl.
USPC ............ 315/250; 315/192; 315/246; 315/312

(58) Field of Classification Search
None
See application file for complete search history.

(56) References Cited

U.S. PATENT DOCUMENTS

| 3,869,641 A | 3/1975 | Goldberg |
| 4,218,627 A | 8/1980 | Kiesel |
| 4,298,869 A | 11/1981 | Okuno |
| 5,699,218 A | 12/1997 | Kadah |
| 5,790,013 A | 8/1998 | Hauck |
| 6,107,744 A | 8/2000 | Bavaro et al. |
| 6,614,103 B1 | 9/2003 | Durocher et al. |
| 6,781,570 B1 | 8/2004 | Arrigo et al. |
| 7,489,086 B2 | 2/2009 | Miskin et al. |
| 7,859,196 B2 | 12/2010 | Lee et al. |
| 8,148,905 B2 | 4/2012 | Miskin et al. |
| 8,179,055 B2 | 5/2012 | Miskin et al. |
| 2003/0043611 A1 | 3/2003 | Bockle et al. |
| 2003/0122502 A1 | 7/2003 | Clauberg et al. |
| 2003/0169014 A1 | 9/2003 | Kadah |
| 2003/0175004 A1 | 9/2003 | Garito et al. |
| 2004/0080941 A1 | 4/2004 | Jiang et al. |
| 2004/0183380 A1 | 9/2004 | Otake |
| 2004/0189218 A1 | 9/2004 | Leong et al. |
| 2004/0201988 A1 | 10/2004 | Allen |
| 2005/0110426 A1 | 5/2005 | Shao |

(Continued)

FOREIGN PATENT DOCUMENTS

| EP | 1 215 944 A1 | 6/2002 |
| JP | 08-137429 | 5/1996 |

(Continued)

OTHER PUBLICATIONS

International Search Report for International Application PCT/US2008/011536.

*Primary Examiner* — Anh Tran
(74) *Attorney, Agent, or Firm* — Factor Intellectual Property Law Group, Ltd.

(57) ABSTRACT

An AC-driven LED assembly with discretely packaged LEDs being connected in an AC circuit and being sized preferably substantially 2.5 mm or less in length and width, and more preferably 2.0 mm or less; and being mounted to a substrate at a distance from the other of preferably approximately 3 mm or less, and more preferably 2.0 mm or less.

5 Claims, 3 Drawing Sheets

(56) References Cited

U.S. PATENT DOCUMENTS

| | | |
|---|---|---|
| 2005/0173990 A1 | 8/2005 | Anderson et al. |
| 2006/0038542 A1 | 2/2006 | Park et al. |
| 2006/0103913 A1* | 5/2006 | Handschy et al. ............ 359/290 |
| 2006/0138971 A1 | 6/2006 | Uang et al. |
| 2006/0158130 A1 | 7/2006 | Furukawa |
| 2007/0069663 A1* | 3/2007 | Burdalski et al. ............ 315/312 |
| 2008/0083929 A1* | 4/2008 | Fan et al. ........................ 257/79 |
| 2008/0116816 A1 | 5/2008 | Neuman et al. |
| 2008/0136347 A1 | 6/2008 | Lin et al. |
| 2008/0158915 A1 | 7/2008 | Williams |
| 2008/0203405 A1 | 8/2008 | Rooymans |
| 2008/0203936 A1 | 8/2008 | Mariyama et al. |
| 2008/0211421 A1 | 9/2008 | Lee et al. |
| 2008/0218098 A1 | 9/2008 | Lee et al. |
| 2009/0021185 A1 | 1/2009 | Ng |
| 2009/0295300 A1 | 12/2009 | King |
| 2010/0039794 A1 | 2/2010 | Ghanem et al. |
| 2012/0043897 A1 | 2/2012 | Miskin et al. |
| 2012/0069560 A1 | 3/2012 | Miskin et al. |

FOREIGN PATENT DOCUMENTS

| | | |
|---|---|---|
| JP | 11-016683 | 1/1999 |
| JP | 11-330561 A1 | 11/1999 |
| WO | 2008124701 | 10/2008 |
| WO | 2011049613 | 4/2011 |
| WO | 2011082168 | 7/2011 |
| WO | 2011143510 | 11/2011 |

* cited by examiner

LED CIRCUITS AND ASSEMBLIES

RELATED APPLICATIONS

This application is a divisional application of U.S. application Ser. No. 12/287,267 filed Oct. 6, 2008 which claims the priority to U.S. Provisional Application No. 60/997,771, filed Oct. 6, 2007—the contents of each of these applications are incorporated herein by reference.

FIELD OF THE INVENTION

The present invention relates generally to light-emitting diode ("LED") circuits and assemblies; and more specifically to scalable alternating current ("AC") driven LED circuits and assemblies.

SUMMARY OF THE INVENTION

While not intending to limit the scope of the claims or disclosure, in brief summary, the present disclosure and claims are directed to providing improved ease of designing and building lighting fixtures using AC-driven LEDs. Disclosed and claimed are LED circuits having scalable circuit configurations and LED package assembly configurations which can be used in an AC-drive platform to more easily match the voltage requirements of the lighting fixture(s) or systems in which the LED's are desired. Circuits and LED package assemblies are claimed and disclosed which reduce objectionable flicker produced from AC-driven LEDs and to produce more light per component. Packaged LED's are provided for lighting design according to the invention which address flicker at low frequencies (e.g. 50/60 Hz) while being scalable as desired for a particular lighting goal without resort to designing individual assemblies at the semiconductor die level. Circuits are also disclosed and claimed which provide for some of the LEDs in a circuit to be on during both positive and negative phases of an AC source, to among other things, address flicker. Also, circuits are claimed and disclosed where a basic circuit design provides a voltage and current performance whereby scalability or matching a particular voltage requirement is achieved by configuring LEDs in the basic design and/or by joining one or more of the basic circuits together in series or parallel to achieve the design requirement.

According to an embodiment of the invention an AC-driven LED circuit is proposed having a first parallel circuit having LEDs. Each LED having an input and an output, and the circuit having at least first and second branches connecting at first and second common points, the common points providing input and output for an AC driving current for the circuit. The first branch having a first and a second LED, and the second branch having a third and a fourth LED. The first LED is connected to the second LED in opposing series relationship with the inputs of the first and second LEDs defining a first branch junction. The third LED is connected to the fourth LED in opposing series with the outputs of the third and fourth LEDs defining a second branch junction. The first and second branches are connected to one another such that the output of the first LED is connected to the input of the third LED at the first common point and the output of the second LED is connected to the input of the fourth LED at the second common point. A first cross-connecting circuit branch having at least a fifth LED, the first cross-connecting circuit being configured such that the input of the fifth LED is connected to second branch junction and the output is connected to the first branch junction.

According to another embodiment of the invention, an AC-driven LED circuit may comprise one or more additional parallel circuits each being the same as the first parallel circuit identified above. Each additional circuit being conductively connected to the first parallel circuit and to one another at their common points for providing an input and an output for an AC driving current of the circuit. According to other embodiments, the additional parallel circuits may be connected in series to the first parallel circuit and to one another or the additional parallel circuits may be connected in parallel to the first parallel circuit and to one another.

According to another embodiment of the invention, n additional LEDs, in pairs, may be provided in the circuit wherein the pairs are configured among the first and second branch circuits of each of the respective parallel circuits, such that current flows through the respective fifth diode of each parallel circuit upon both a negative and positive phase of the AC driving source and so that the current draw through each of the respective parallel circuits during both AC phases is substantially the same.

According to another embodiment the AC-driven LED circuit further comprises x cross-connecting circuit branches each having one or more LEDs and being configured such that current flows through each of the respective one or more LEDS upon both a negative and positive phase of the AC driving source and so that the current draw through each of the respective parallel circuits during both AC phases is substantially the same.

According to another embodiment of the invention, an AC-driven LED assembly comprises at least a first and a second LED each discretely packaged, the LEDs being connected in an AC circuit and each LED package being mounted to a substrate at a distance from the other of preferably approximately 3 mm or less, and more preferably 2.0 mm or less. In an embodiment the packaged LEDs also each have a length of preferably approximately 2.5 mm or less, and more preferably 2.0 mm or less. In an embodiment the packaged LEDs also each have a width of preferably approximately 2.5 mm or less, and more preferably 2.0 mm or less. In an embodiment the LED packages are arranged with respect to each other in a linear spatial relationship while in another embodiment the LED packages are arranged with respect to each other in an XY rectilinear spatial relationship.

DETAILED DESCRIPTION OF THE PRESENT INVENTION

Figure 1:
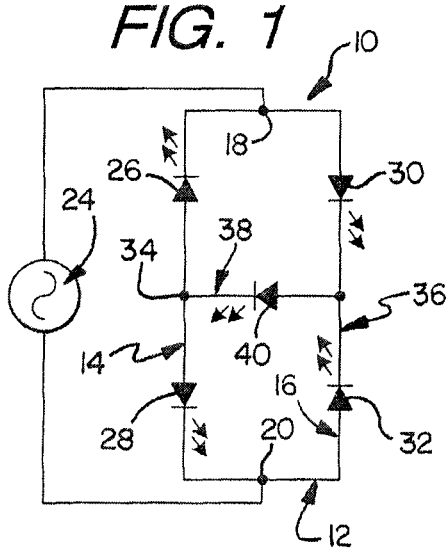
FIG. 1 is a schematic view of an AC-driven LED circuit according to an embodiment of the invention.

While this invention is susceptible to embodiments in many different forms, there are shown in the drawings and will herein be described in detail, preferred embodiments of the invention with the understanding that the present disclosures are to be considered as exemplifications of the principles of the invention and are not intended to limit the broad aspects of the invention to the embodiments illustrated. Like components in the various FIGURES will be given like reference numbers.

FIG. 1 discloses an AC-driven LED circuit 10 including a first parallel circuit 12 having a first branch 14, and a second branch 16. Branches 14, 16 connect at first common point 18 and second common point 20. The common points 18, 20 provide input and output for an AC driving current from a driver 24 for the circuit.

The first branch 14 has a first LED 26 and a second LED 28, and the second branch 16 having a third LED 30 and a fourth LED 32. The first LED 26 is connected to the second LED 28 in opposing series relationship with the inputs of the first and second LEDs 26, 28 defining a first branch junction 34. The third LED 30 is connected to the fourth LED 32 in opposing series with the outputs of the third and fourth LEDs 30, 32 defining a second branch junction 36.

The first and second branches 34, 36 are connected to one another such that the output of the first LED 26 is connected to the input of the third LED 30 at the first common point 18 and the output of the second LED 28 is connected to the input of the fourth LED 32 at the second common point 20. A first cross-connecting circuit branch 38 has a fifth LED 40. The first cross-connecting circuit branch 38 being configured such that the input of the fifth LED 40 is connected to second branch junction 36 and the output is connected to the first branch junction 34.

As will be appreciated by those of skill in the art, the LED's 26 and 32 will provide light only upon one half of an AC wave, pulse or phase, while LEDs 28 and 30 will provide light only upon the opposite wave, pulse or phase. At lower frequencies, e.g. mains frequencies, if the LEDs are spaced pursuant to another aspect of the invention (disclosed below) at preferably approximately 3.0 mm or less preferably approximately 2.0 mm or less, then the amount of noticeable flicker may not be unacceptable. However, the cross connecting circuit 38 and diode 40 will be on (produce light) in both phases of the AC drive and hence mitigate flicker which may be evidenced in its surrounding LEDs 26, 28, 30 and 32.

Figure 2:
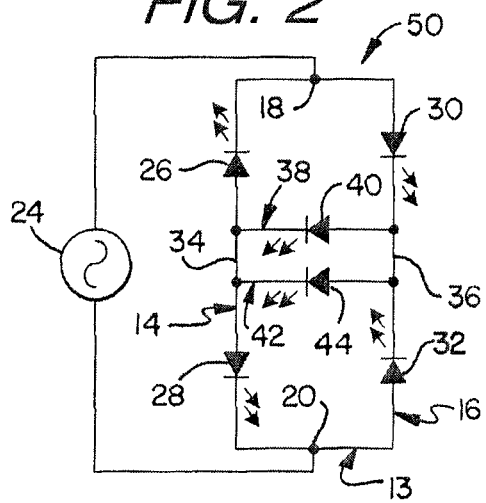
FIG. 2 is a schematic view of an AC-driven LED circuit according to an embodiment of the invention.
Figure 9:
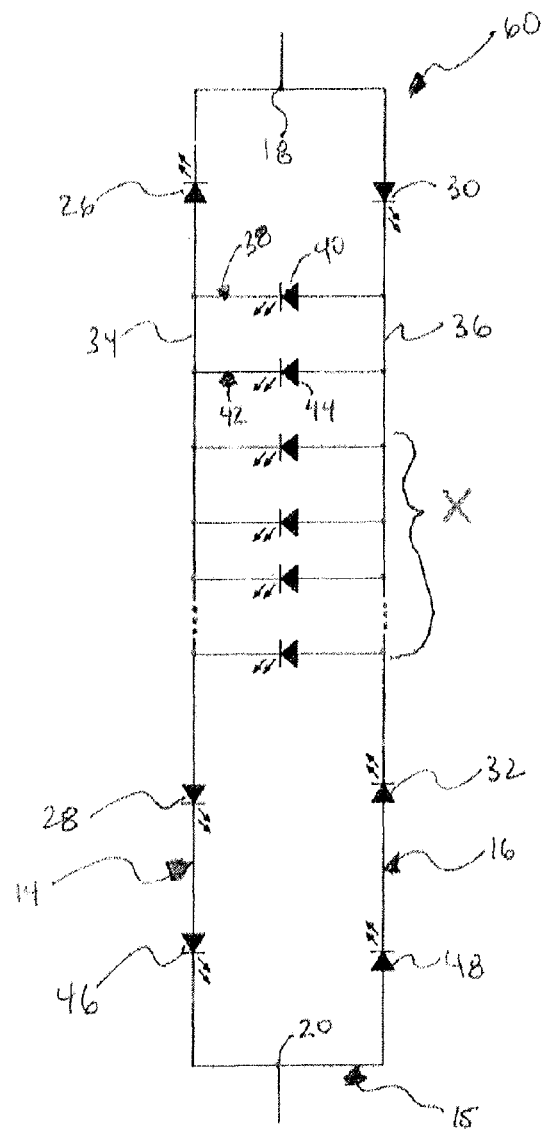
FIG. 9 is a schematic view of an AC-driven LED circuit according to an embodiment of the invention; and, FIG. 10 is a schematic view of an AC-driven LED circuit according to an embodiment of the invention.

FIG. 2 discloses an AC-driven LED circuit 50 which is a modification of AC-driven LED circuit 10. Circuit 50 further mitigates flicker. Circuit 50 provides an additional cross-connecting circuit branch 42 having LED 44. The LEDS 40, 44 are configured such that current flows through each upon both a negative and positive phase of the AC driving source 24. It should be appreciated that according to the invention x number of such cross connecting circuit branches (such as 38, 42) may be added as desired (see for e.g. FIG. 9), however, since the LEDs (such as LEDs 40, 44) are in parallel with each other, their voltage demand will be divided while their current draw will not. Hence a suitable driver need be provided for this circumstance.

Figure 3:
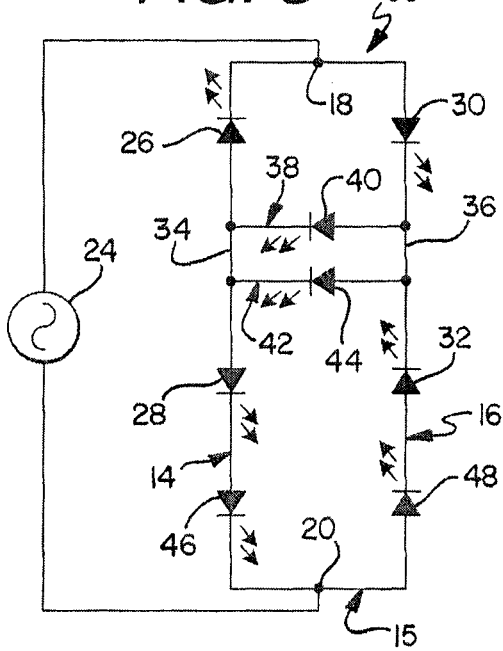
FIG. 3 is a schematic view of an AC-driven LED circuit according to an embodiment of the invention.
Figure 10:
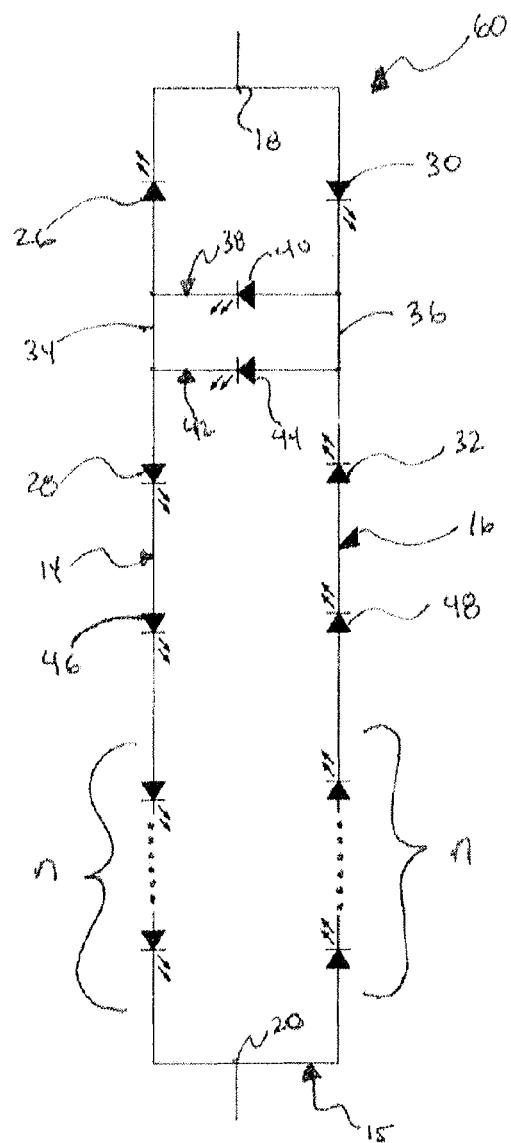

To increase the light output of the circuit of the invention, it should be noted as disclosed in FIGS. 3 and 10 that additional or n LEDS may be provided in the branches 14 and 16.

Specifically FIG. 3 discloses an AC-driven circuit 60 which is a modification of circuit 50. Circuit 60 provides for additional LEDs 46 and 48. The pair of LEDs are configured among the first and second branch circuits 14, 16 of the parallel circuit 15 such that current flows through the respective diodes 40, 44 upon both a negative and positive phase of the AC driving source 24 and so that the current draw through parallel circuit 15 during both AC phases is substantially the same.

It should be noted that according to the invention, n pairs of LEDs can be configured among first and second branch circuits of a respective parallel circuit (see for e.g., FIG. 10), such that current flows through the respective cross connecting circuit branch LEDs of a parallel circuit upon both a negative and positive phase of the AC driving source and so that the current draw through each of the respective parallel circuits during both AC phases is substantially the same. More LEDs in the branch circuits divide the current from the higher current LEDs in cross connecting circuits 38, 42.

According to another aspect of the invention, to further mitigate the amount of flicker perceived, adding to the light provided and to scalability, additional parallel circuits, each being the same as the first parallel circuit, may be conductively connected to the first parallel circuit in series or parallel at the their common points 18, 20 for providing an input and an output for an AC driving current for the circuit.

Figure 4:
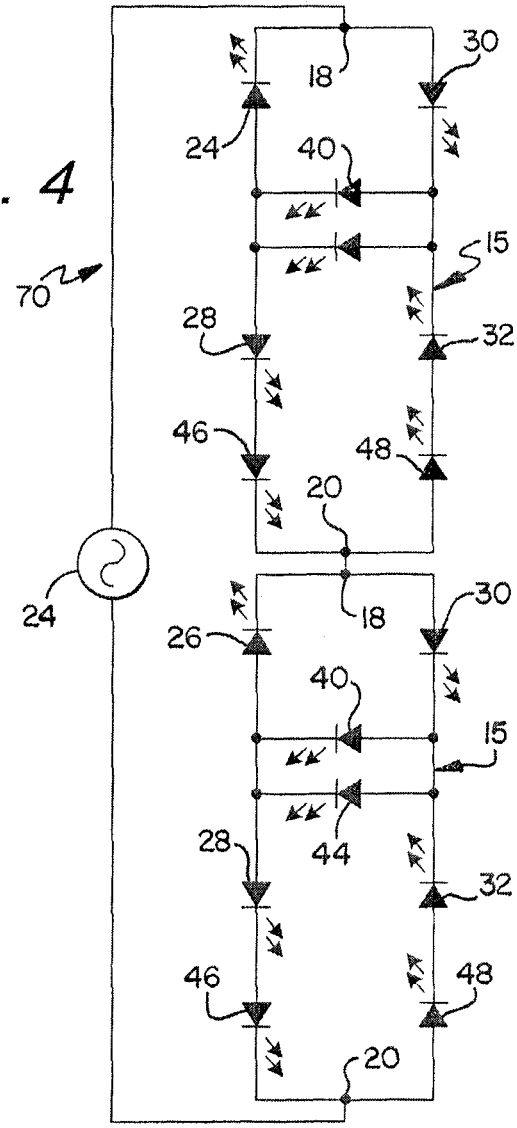
FIG. 4 is a schematic view of an AC-driven LED circuit according to an embodiment of the invention.
Figure 5:
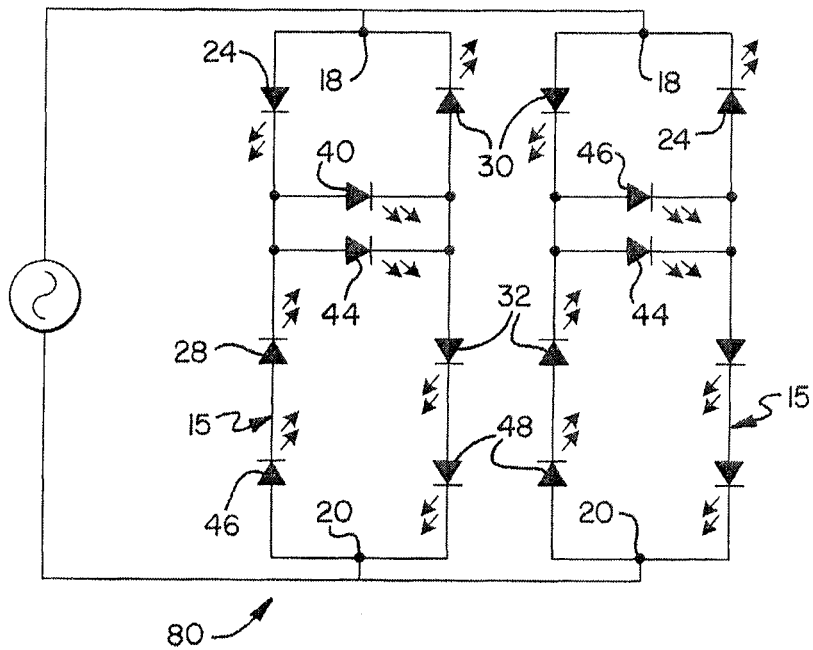
FIG. 5 is a schematic view of an AC-driven LED circuit according to an embodiment of the invention.

For instance, FIG. 4 discloses an AC-driven LED circuit 70 which includes additional parallel circuits 15 connected in series at common points 18, 20. Additionally, as seen in FIG. 5, an AC-driven LED circuit 80 includes additional parallel circuits 15 connected in parallel at common points 18, 20. This embodiment shows the utility of providing a scalable circuit that can be manufactured modularly and used to connect to match higher voltage requirements e.g. circuit 15 may draw drawing 12 V AC while two such circuits 15 in series would meet 24V AC requirements.

Preferably, the number and type of LEDs in the AC-driven LED circuit draws a combined current and combined voltage which is substantially equal to the nominal voltage capacity of the AC drive source.

Figure 6:
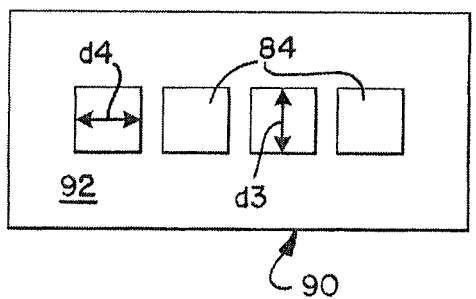
FIG. 6 is a schematic top view of an AC-driven LED assembly according to an embodiment of the invention.

As shown in FIG. 6, an AC-driven LED assembly 90 has a first and a second LED 82 each discretely packaged, the LEDs being connected in an AC circuit and each LED package 82 being mounted to a substrate 92 at a distance d1 from the other of preferably approximately 3 mm or less, and more preferably 2.0 mm or less. The AC-driven LED assembly 90 also has packaged LEDs 84 each having a width d2 and a length d3 of preferably approximately 2.5 mm or less, and more preferably 2.0 mm or less.

Figure 7:
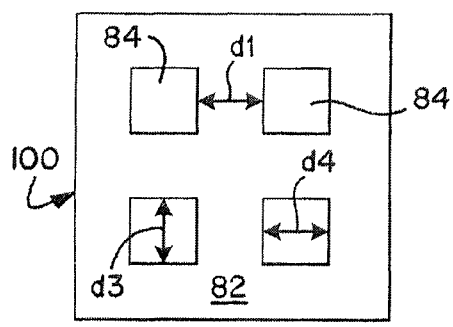
FIG. 7 is a schematic top view of an AC-driven LED assembly according to an embodiment of the invention.

FIG. 6 discloses an AC-driven LED assembly 90 wherein the LED packages 84 are arranged with respect to each other in a linear spatial relationship, while FIG. 7 discloses an assembly 100 wherein the LED packages 84 are arranged with respect to each other in an XY rectilinear spatial relationship.

Figure 8:
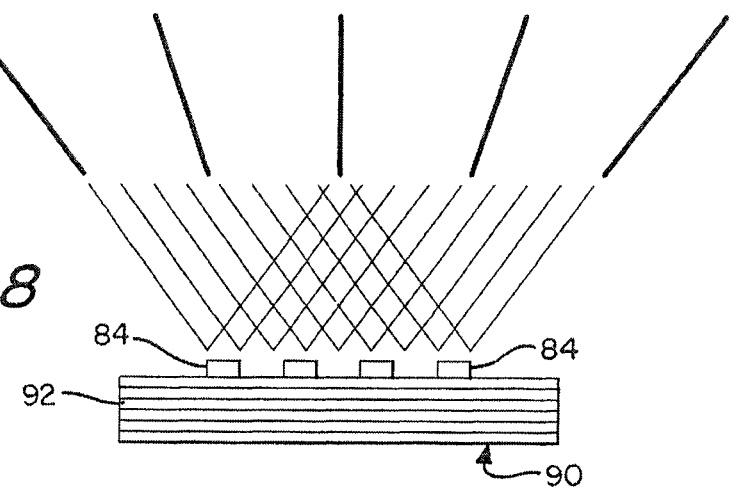
FIG. 8 is a schematic side view of an AC-driven LED assembly according to an embodiment of the invention.

As can be seen in FIG. 8, when LED packages 84 are placed at 3 mm or less, the light produced there from intersects, thereby reducing or eliminating the effects of flicker.

As would be known to one skilled in the art, various embodiments of the LED packages, substrates, and assemblies may be produced, such as creating an AC-driven circuit where all circuits and LEDs are formed on a semiconductor, where the LED are discretely packaged apart from the circuits, and where each parallel circuit is formed on a printed circuit board.

While in the preceding there has been set forth a preferred embodiment of the invention, it is to be understood that the present invention may be embodied in other specific forms without departing from the spirit or central characteristics thereof. The present embodiments, therefore, are to be considered in all respects as illustrative and not restrictive, and the invention is not to be limited to the details given herein. While specific embodiments have been illustrated and described, numerous modifications come to mind without significantly departing from the characteristics of the invention and the scope of protection is only limited by the scope of the accompanying Claims.

I claim:

1. An AC-driven LED assembly comprising:
   at least a first and a second LED each discretely packaged, the LEDs being connected in an AC circuit and each LED package being mounted to a substrate at a distance from the other of preferably approximately 3 mm or less, and more preferably 2.0 mm or less.

2. The AC-driven LED assembly according to claim 1 wherein the packaged LEDs each have a length of preferably approximately 2.5 mm or less, and more preferably 2.0 mm or less.

3. The AC-driven LED assembly according to claim 1 wherein the packaged LEDs each have a width of preferably approximately 2.5 mm or less, and more preferably 2.0 mm or less.

4. The AC-driven LED assembly according to claim 1 wherein the LED packages are arranged with respect to each other in a linear spatial relationship.

5. The AC-driven LED assembly according to claim 1 wherein the LED packages are arranged with respect to each other in an XY rectilinear spatial relationship.

* * * * *